(12) United States Patent
Chai et al.

(10) Patent No.: US 11,648,944 B2
(45) Date of Patent: May 16, 2023

(54) DEVICE AND METHOD FOR CONTROLLING ELECTRIC OIL PUMP OF VEHICLE

(71) Applicants: HYUNDAI MOTOR COMPANY, Seoul (KR); KIA CORPORATION, Seoul (KR)

(72) Inventors: Min Jae Chai, Gwangmyeong-si (KR); Byeong Wook Jeon, Seoul (KR); Yong Uk Shin, Seongnam-si (KR); Dong Hoon Jeong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/371,782

(22) Filed: Jul. 9, 2021

(65) Prior Publication Data
US 2022/0268356 A1   Aug. 25, 2022

(30) Foreign Application Priority Data

Feb. 22, 2021   (KR) .................. 10-2021-0023604

(51) Int. Cl.
*B60W 10/30* (2006.01)
*B60W 30/18* (2012.01)
*B60W 10/06* (2006.01)

(52) U.S. Cl.
CPC ...... *B60W 30/18054* (2013.01); *B60W 10/06* (2013.01); *B60W 10/30* (2013.01); *B60W 2510/0642* (2013.01); *B60W 2710/30* (2013.01)

(58) Field of Classification Search
CPC ............ B60W 10/06; B60W 2710/30; B60W 2510/0642; B60W 30/18054
See application file for complete search history.

(56) References Cited

FOREIGN PATENT DOCUMENTS

| JP | 2020090941 A | * | 6/2020 |
| KR | 20170023660 A | * | 3/2017 |

OTHER PUBLICATIONS

Takahara et al., Continuously Variable Transmission Control System for Toyota Intelligen Idling Stop, SAE Transaction, Mechanical Systems Journal; vol. 113, Seciton 6: Journal of Passenger Cars; pp. 954-950 (2004).*
Machine Translation of JP-2020090941 using Espacenet (2022).*
Machine Translation of KR-20170023660 using Espacenet (2022).*

* cited by examiner

*Primary Examiner* — Abi Y Teka
*Assistant Examiner* — Daniel S Collins
(74) *Attorney, Agent, or Firm* — Morgan, Lewis & Bockius LLP (57) ABSTRACT

A device for controlling an electric oil pump (EOP), which is configured to supply a hydraulic pressure to a vehicle, includes a controller that controls driving of the EOP based on lighting information of a traffic light corresponding to a travel direction of the vehicle in a state in which an engine of the vehicle is stopped as an Idle Stop and Go (ISG) system of the vehicle is operated.

18 Claims, 5 Drawing Sheets

DEVICE AND METHOD FOR CONTROLLING ELECTRIC OIL PUMP OF VEHICLE

CROSS-REFERENCE TO RELATED APPLICATION

This application claims the benefit of priority to Korean Patent Application No. 10-2021-0023604, filed in the Korean Intellectual Property Office on Feb. 22, 2021, the entire contents of which are incorporated herein by reference.

TECHNICAL FIELD

The present disclosure relates to a technology for controlling driving of an Electric Oil Pump (EOP) to prevent unnecessary consumption of a battery when an engine is stopped because of an operation of an Idle Stop and Go (ISG) system mounted on a vehicle.

BACKGROUND

In general, an Idle Stop and Go (ISG) system maintains a D (driving) stage in a state in which a vehicle is stopped, and stops an engine when a brake pedal is pressed by a driver (hereinafter, the brake pedal is in an ON state), thereby improving fuel economy and reducing exhaust gas.

When an engine is stopped, while the brake pedal is not pressed by the driver (hereinafter, the brake pedal is in an OFF state) or an accelerator pedal is pressed (hereinafter, the accelerator pedal is in an ON state), the ISG system determines this as a restart request from the driver and starts the engine.

Since the state in which the engine is stopped continues for a longer time than an expected time, the ISG system must be equipped with an Electric Oil Pump (EOP) to prevent an oscillation shock and a shift delay caused by lowering of a hydraulic pressure supplied to an automatic transmission. Such an EOP supplies oil to the automatic transmission in the state in which the engine of the vehicle is stopped to enable a stable shift.

A conventional technology for controlling the EOP equipped in the automatic transmission vehicle maintains a hydraulic pressure of a clutch system in the automatic transmission by continuously driving the EOP even in the state in which the engine of the vehicle is stopped as the ISG system is operated.

Such conventional technology has a problem of unnecessarily increasing power consumption of a battery because the EOP is continuously driven even in the state in which the engine is stopped to maintain the hydraulic pressure of the clutch system in the automatic transmission.

The matters described in this background are written to enhance an understanding of the background of the disclosure, and may include matters other than the prior art already known to those of ordinary skill in the field to which this technology belongs.

SUMMARY

The present disclosure has been made to solve the above-mentioned problems occurring in the prior art while advantages achieved by the prior art are maintained intact.

An aspect of the present disclosure provides a device and a method for controlling an Electric Oil Pump (EOP) of a vehicle that control driving (ON/OFF) of the EOP based on lighting information of a traffic light corresponding to a travel direction of the vehicle in a state in which an engine is stopped as an Idle Stop and Go (ISG) system equipped in the vehicle is operated, thereby not only preventing unnecessary increase in power consumption of a battery equipped in the vehicle, but also improving fuel economy of the vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling an Electric Oil Pump (EOP), which supplies hydraulic pressure to a vehicle, includes a controller that controls driving of the EOP based on lighting information of a traffic light corresponding to a travel direction of the vehicle in a state in which an engine is stopped as an Idle Stop and Go (ISG) system of the vehicle is operated.

The controller may turn off the EOP when the engine is stopped as the ISG system of the vehicle is operated.

The controller may acquire a waiting time for lighting the traffic light corresponding to the travel direction of the vehicle from a traffic light system, determine a traffic light lighting time point from the acquired traffic light lighting waiting time, and turn on the EOP at a time point ahead, by a reference time, of the determined traffic light lighting time point.

The controller may acquire a waiting time for lighting the traffic light corresponding to the travel direction of the vehicle from a traffic light system, and maintain an ON state of the EOP when the acquired traffic light lighting waiting time is equal to or less than a reference time.

In one implementation, the controller may acquire travel route information of the vehicle from a navigation device equipped in the vehicle, and detect a traffic light located in front of the vehicle based on the acquired travel route information.

The controller may maintain an ON state of the EOP when the travel direction of the vehicle is a right turn.

The device may further include a sensor that measures a spaced distance from a preceding vehicle, and the controller may maintain an ON state of the EOP when the spaced distance from the preceding vehicle exceeds a reference distance.

According to another aspect of the present disclosure, a device for controlling an EOP of a vehicle includes a sensor that measures a spaced distance from a preceding vehicle, the electric oil pump (EOP) that supplies a hydraulic pressure to the vehicle, and a controller that controls driving of the EOP based on the spaced distance from the preceding vehicle in a state in which e an engine is stopped as an idle stop and go (ISG) system of the vehicle is operated.

The controller may maintain an ON state of the EOP when the spaced distance from the preceding vehicle exceeds a reference distance, and turn off the EOP when the spaced distance from the preceding vehicle does not exceed the reference distance.

The controller may acquire a waiting time for lighting a traffic light corresponding to a travel direction of the vehicle from a traffic light system when the EOP is turned off, determine a traffic light lighting time point from the acquired traffic light lighting waiting time, and turn on the EOP at a time point ahead, by the reference time, of the determined traffic light lighting time point.

According to another aspect of the present disclosure, a method for controlling an EOP of a vehicle includes stopping, by an idle stop and go (ISG) system equipped in the vehicle, an engine, acquiring, by a controller, lighting information of a traffic light corresponding to a travel direction of the vehicle, and controlling driving of the electric oil pump (EOP) based on the acquired traffic light lighting information.

The controlling of the driving of the EOP may include turning off the EOP, acquiring a waiting time for lighting the traffic light corresponding to the travel direction of the vehicle from a traffic light system, determining a traffic light lighting time point from the acquired traffic light lighting waiting time, and turning on the EOP at a time point ahead, by a reference time, of the determined traffic light lighting time point.

The controlling of the driving of the EOP may include acquiring a waiting time for lighting the traffic light corresponding to the travel direction of the vehicle from a traffic light system, and maintaining an ON state of the EOP when the acquired traffic light lighting waiting time is equal to or less than a reference time.

The acquiring of the traffic light lighting waiting time may include acquiring travel route information of the vehicle from a navigation device equipped in the vehicle, and detecting a traffic light located in front of the vehicle based on the acquired travel route information.

The controlling of the driving of the EOP may include maintaining an ON state of the EOP when the travel direction of the vehicle is a right turn.

In one implementation, the method may further include measuring, by a sensor, a spaced distance from a preceding vehicle.

The controlling of the driving of the EOP may include maintaining an ON state of the EOP when the spaced distance from the preceding vehicle exceeds a reference distance.

BRIEF DESCRIPTION OF THE DRAWINGS

The above and other objects, features and advantages of the present disclosure will be more apparent from the following detailed description taken in conjunction with the accompanying drawings.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the team "connect" or its derivatives refer both to direct and indirect connection.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that teams, such as those defined in commonly used dictionaries, should be interpreted as having a meaning that is consistent with their meaning in the context of the relevant art and will not be interpreted in an idealized or overly formal sense unless expressly so defined herein.

Figure 1:
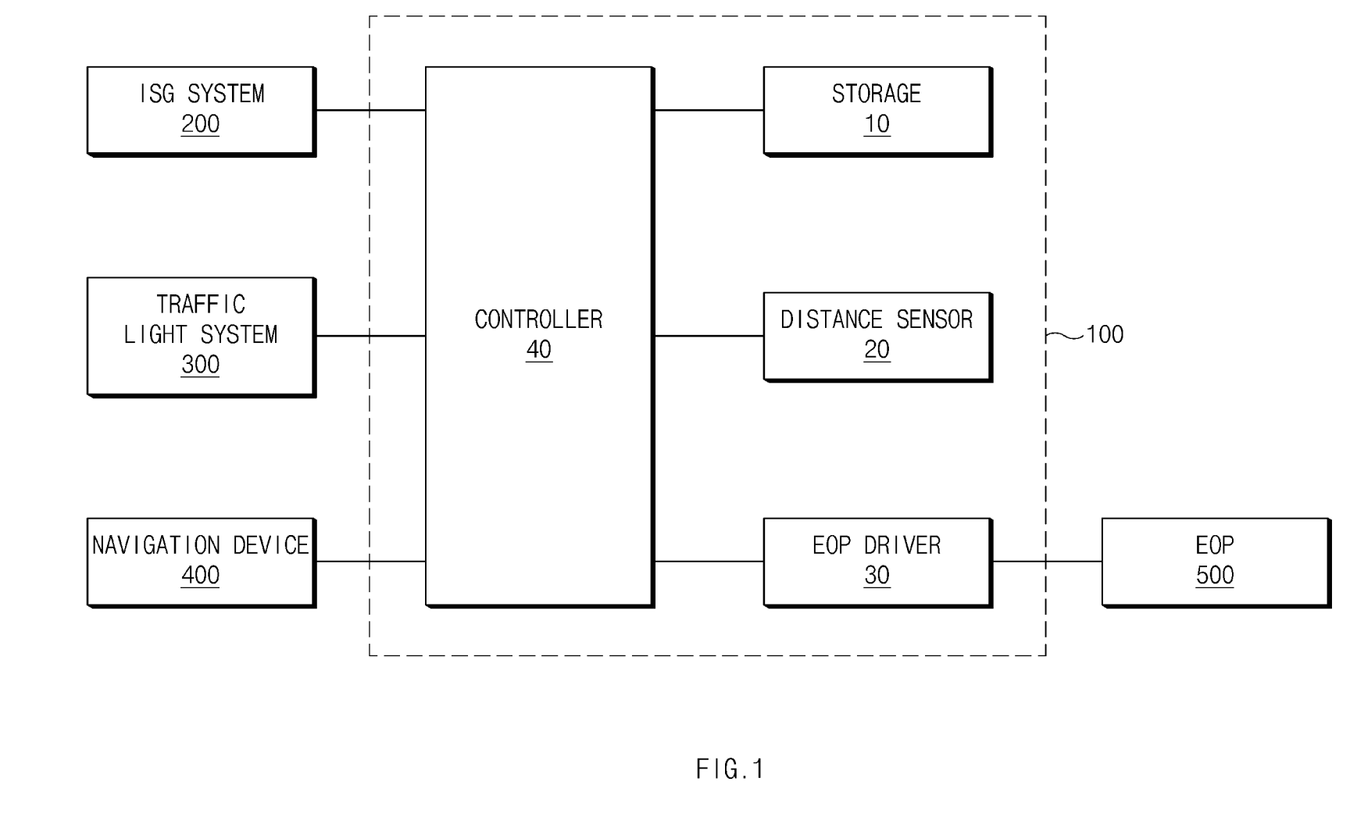
FIG. 1 is a block diagram of a device for controlling an Electric Oil Pump (EOP) of a vehicle according to an embodiment of the present disclosure.

FIG. 1 is a block diagram of a device for controlling an Electric Oil Pump (EOP) of a vehicle according to an embodiment of the present disclosure.

As shown in FIG. 1, a device 100 for controlling an EOP of a vehicle according to an embodiment of the present disclosure may include a storage 10, a distance sensor 20, an electric oil pump (EOP) driver 30, and a controller 40. In this connection, depending on a scheme for implementing the device 100 for controlling the EOP of the vehicle according to an embodiment of the present disclosure, components may be combined with each other to be implemented as one component or some components may be omitted. In particular, a function of the EOP driver 30 may be implemented to be performed by the controller 40.

In addition, the device 100 for controlling the EOP of the vehicle according to an embodiment of the present disclosure may be in association with an ISG system 200, a traffic light system 300, a navigation device 400, an electric oil pump (EOP) 500, and the like of the vehicle.

Each of the components will be described. First, in a state in which an engine is stopped as the ISG system 200 equipped in the vehicle is operated, the storage 10 may store various logics, algorithms, and programs required in a process of controlling driving (ON/OFF) of the EOP 500 based on lighting information of a traffic light corresponding to a travel direction (a travel route) of the vehicle.

The storage 10 may store reference time information (e.g., 5 seconds) used by the controller 40 to determine a driving time point of the EOP 500 based on the lighting information of the traffic light corresponding to the travel direction of the vehicle. In this connection, the reference time information may be arbitrarily changed based on an intention of a designer.

The storage 10 may include at least one type of recording media (storage media) of a memory of a flash memory type, a hard disk type, a micro type, a card type (e.g., a secure digital card (SD card) or an eXtream digital card (XD card)), and the like, and/or a memory of a random access memory (RAM), a static RAM (SRAM), a read-only memory (ROM), a programmable ROM (PROM), an electrically erasable PROM (EEPROM), a magnetic RAM (MRAM), a magnetic disk, and an optical disk type.

The distance sensor 20, which is a sensor mounted on a front side of the vehicle to measure a spaced distance from a preceding vehicle, may include a light detection and ranging (LiDAR) sensor, a radio detecting and ranging (Radar) sensor, an ultrasonic sensor, a camera sensor, and the like.

The EOP driver 30 may adjust a hydraulic pressure of a clutch system in an automatic transmission equipped in the vehicle by driving the EOP 500 at a set revolution per minute (RPM) under control of the controller 40.

The controller 40 may perform overall control such that each of the components may normally perform a function thereof. Such controller 40 may be implemented in a form of hardware, may be implemented in a form of software, or may be implemented in a form in which the hardware and the software are combined with each other. The controller 40 may be implemented as a microprocessor, but may not be limited thereto.

Furthermore, the term related to a control device such as "controller", "control unit", "control device" or "control module", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned disclosure can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

In particular, in the state in which the engine is stopped as the ISG system 200 equipped in the vehicle is operated, the controller 40 may perform various controls in the process of controlling the driving (ON/OFF) of the EOP 500 based on the lighting information of the traffic light corresponding to the travel direction (the travel route) of the vehicle.

Hereinafter, an operation of the controller 40 will be described in detail with reference to FIG. 2.

Figure 2:
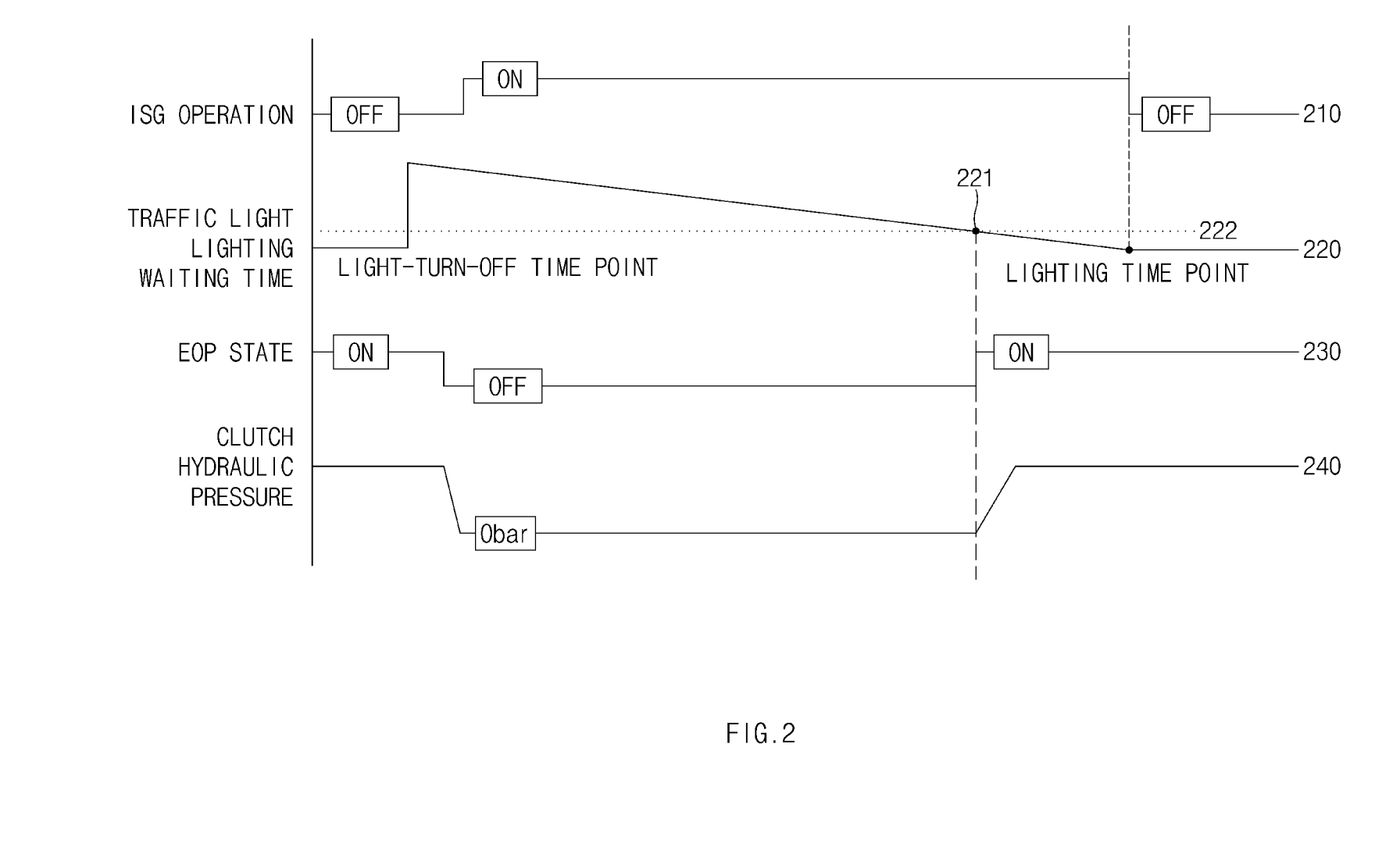
FIG. 2 is an exemplary view illustrating an operation of a controller equipped in a device for controlling an EOP of a vehicle according to an embodiment of the present disclosure.

FIG. 2 is an exemplary view illustrating an operation of a controller equipped in a device for controlling an EOP of a vehicle according to an embodiment of the present disclosure.

In FIG. 2, reference numeral '210' is a graph showing an operation state (ON/OFF) of the ISG system 200. 'ISG OFF' represents a state in which driving of the engine is maintained because the ISG system 200 has not operated, and 'ISG ON' represents the state in which the engine is stopped as the ISG system 200 is operated.

Reference numeral '220' is the traffic light lighting information, and represents a waiting time for lighting the traffic light corresponding to the travel direction of the vehicle. As an example, when the travel direction of the vehicle is a forward direction, the traffic light lighting waiting time represents a time it takes from a current time point until a forward travel signal is turned on. As another example, when the travel direction of the vehicle is a left turn, the traffic light lighting waiting time represents a time it takes from the current time point until a left turn signal is turned on.

Reference numeral '221' is a time point ahead, by a reference time 222, of a time point for lighting the traffic light corresponding to the travel direction of the vehicle, and represents a time point for controlling the EOP driver 30 such that the controller 40 drives the EOP 500.

Reference numeral '230' is a graph showing an operation state of the EOP 500. 'ON' represents a state (a driving state) in which the EOP 500 supplies oil to the automatic transmission, and 'OFF' represents a state (a stopped state) in which the EOP 500 does not supply the oil to the automatic transmission.

Reference numeral '240' is a graph showing the hydraulic pressure of the clutch. When the EOP 500 is in the driving state, the hydraulic pressure of the clutch is maintained at a reference value. In addition, when the EOP 500 is in the stopped state, the hydraulic pressure of the clutch decreases to be equal to or below the reference value and eventually becomes 0 bar.

The operation of the controller 40 will be described based on this. The controller 40 controls the EOP driver 30 to turn off the EOP 500 when the engine is stopped as the ISG system 200 equipped in the vehicle is operated.

In the state in which the engine is stopped as the ISG system 200 equipped in the vehicle is operated, the controller 40 acquires the waiting time for lighting the traffic light corresponding to the travel direction of the vehicle from the traffic light system 300, determines the traffic light lighting time point from the acquired traffic light lighting waiting time, and controls the EOP driver 30 to drive the EOP 500 at the time point ahead, by the reference time, of the determined traffic light lighting time point. In this connection, the controller 40 may acquire travel route information of the vehicle from the navigation device 400 equipped in the vehicle, and may detect information on the traffic light located ahead at a time point at which the vehicle is stopped based on the acquired travel route information.

That is, the controller 40 does not control the EOP driver 30 to drive the EOP 500 unconditionally, but controls the EOP driver 30 to drive the EOP 500 at the time point ahead, by the reference time, of the traffic light lighting time point in the state in which the engine is stopped as the ISG system 200 is operated (ON), thereby preventing unnecessary consumption of a battery because of the driving of the EOP 500.

In addition, the controller 40 drives the EOP 500 before a time point at which the engine is restarted through the EOP driver 30 such that the hydraulic pressure of the automatic transmission is maintained at the reference value at the time point at which the engine is restarted, thereby preventing an oscillation shock and a shift delay when the vehicle departs.

In one example, in the state in which the engine is stopped as the ISG system 200 is operated (ON), the controller 40 may not turn off the EOP 500 when the waiting time for lighting the traffic light corresponding to the travel direction of the vehicle acquired from the traffic light system 300 is equal to or less than the reference time. That is, the controller 40 may maintain the operation state of the EOP 500 when a vehicle stopping time is not long.

In the state in which the engine is stopped as the ISG system 200 is operated (ON), when the travel direction of the vehicle is a right turn, the controller 40 may not turn off the EOP 500. This is because in most countries, including the United States, a traffic light on a road does not provide a right turn signal of the vehicle. However, in some countries, the traffic light on the road provides the right turn signal of the vehicle, but does not provide the left turn signal. Thus, when the technology of the present disclosure described above is applied, it is obvious to those skilled in the art that it may be changed appropriately.

As another embodiment, the present disclosure may control the driving of the EOP 500 based on the waiting time for lighting the traffic light corresponding to the travel direction of the vehicle acquired from the traffic light system 300, the travel route information of the vehicle acquired from the navigation device 400, and the spaced distance from the preceding vehicle measured through the distance sensor 20.

Figure 3:
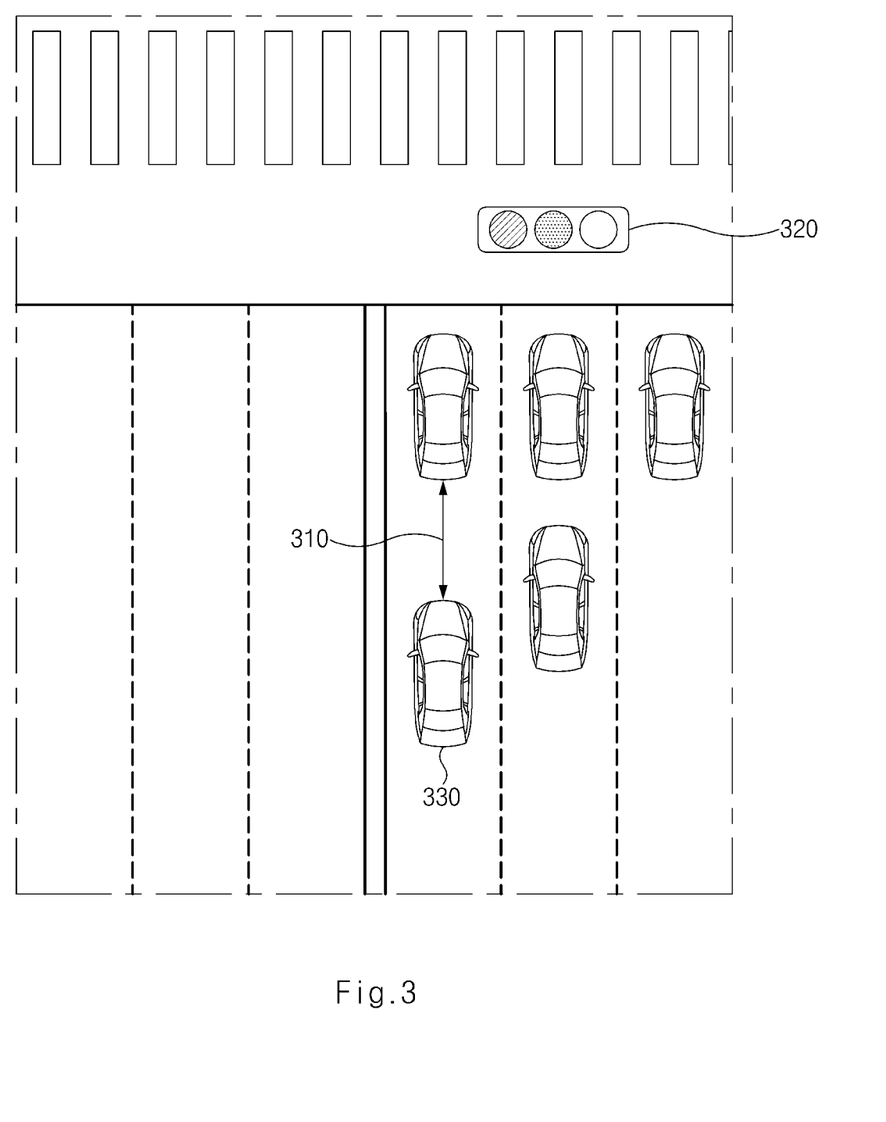
FIG. 3 is another example illustrating an operation of a controller equipped in a device for controlling an EOP of a vehicle according to an embodiment of the present disclosure.

Specifically, as shown in FIG. 3, when a spaced distance 310 from the preceding vehicle exceeds a reference distance (e.g., 3 m), the EOP 500 may not be turned off. This is because the driver is able to operate the engine of the vehicle to narrow a vehicle-to-vehicle distance from the preceding vehicle.

FIG. 3 is another example illustrating an operation of a controller equipped in a device for controlling an EOP of a vehicle according to an embodiment of the present disclosure.

As shown in FIG. 3, in a state in which a traffic light 320 corresponding to the travel direction of the vehicle is lit in red and a vehicle 330 is stopped, that is, in a state in which an engine of the vehicle 330 is stopped as the ISG system 200 is operated, the controller 40 acquires the spaced distance 310 from a preceding vehicle through the distance sensor 20, and does not turn off the EOP 500 in operation when the acquired spaced distance 310 exceeds the reference distance.

Figure 4:
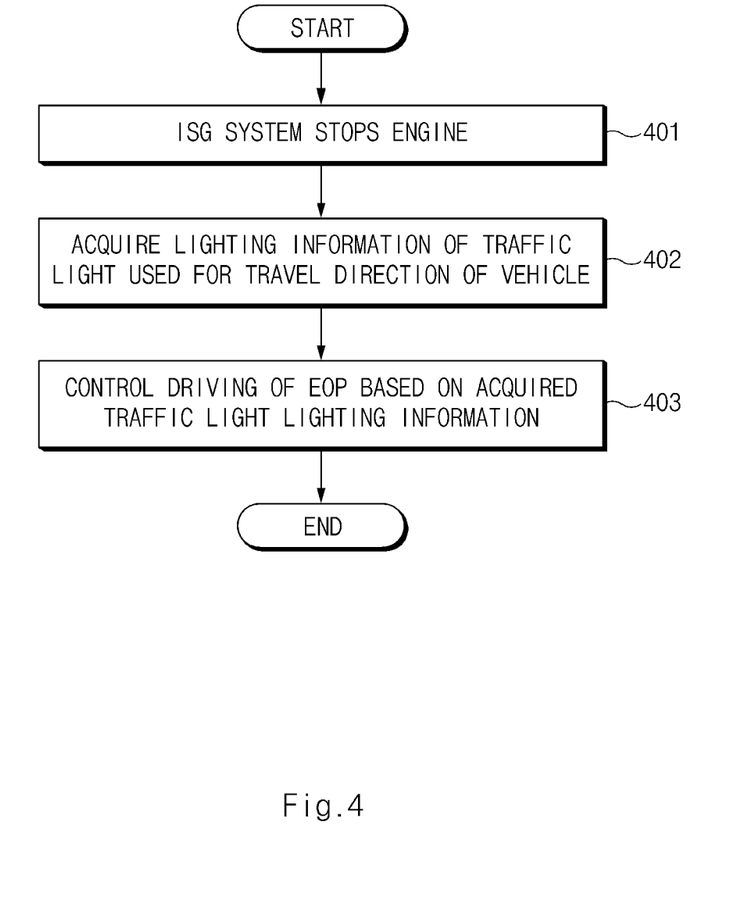
FIG. 4 is a flowchart of a method for controlling an EOP of a vehicle according to an embodiment of the present disclosure.

FIG. 4 is a flowchart of a method for controlling an EOP of a vehicle according to an embodiment of the present disclosure.

First, the idle stop and go (ISG) system 200 equipped in the vehicle stops the engine (401).

Thereafter, the controller 40 acquires the lighting information of the traffic light corresponding to the travel direction of the vehicle from the traffic light system 300 (402).

Thereafter, the controller 40 controls the driving of the electric oil pump (EOP) based on the acquired traffic light lighting information (403).

Figure 5:
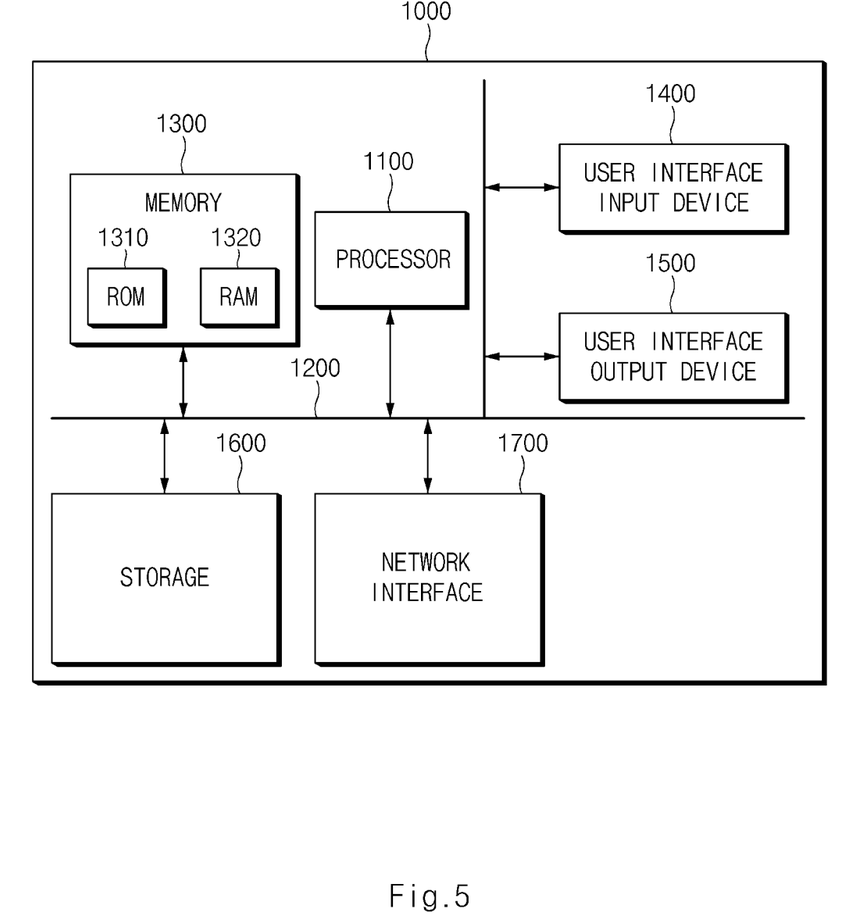
FIG. 5 is a block diagram illustrating a computing system for executing a method for controlling an EOP of a vehicle according to an embodiment of the present disclosure.

FIG. 5 is a block diagram illustrating a computing system for executing a method for controlling an EOP of a vehicle according to an embodiment of the present disclosure.

Referring to FIG. 5, the method for controlling the EOP of the vehicle according to an embodiment of the present disclosure described above may also be implemented using a computing system. A computing system 1000 may include at least one processor 1100, a memory 1300, a user interface input device 1400, a user interface output device 1500, storage 1600, and a network interface 1700 connected via a system bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD), a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device and the method for controlling the EOP of the vehicle according to an embodiment of the present disclosure as described above control the driving (ON/OFF) of the EOP based on the lighting information of the traffic light corresponding to the travel direction of the vehicle in the state in which the engine is stopped as the ISG system equipped in the vehicle is operated, thereby not only preventing the unnecessary increase in the power consumption of the battery equipped in the vehicle, but also improving the fuel economy of the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling an Electric Oil Pump (EOP), which is configured to supply a hydraulic pressure to a vehicle, the device comprising a controller configured to control driving of the EOP based on lighting information of a traffic light corresponding to a travel direction of the vehicle in a state in which an engine of the vehicle is stopped as an Idle Stop and Go (ISG) system of the vehicle is operated,
wherein the controller is configured to turn off the EOP when the engine is stopped as the ISG system of the vehicle is operated.

2. The device of claim 1, wherein the controller is further configured to:
acquire a waiting time for lighting the traffic light corresponding to the travel direction of the vehicle from a traffic light system,
determine a traffic light lighting time point from the acquired traffic light lighting waiting time, and
turn on the EOP at a time point ahead, by a reference time, of the determined traffic light lighting time point.

3. The device of claim 1, wherein the controller is configured to:
acquire a waiting time for lighting the traffic light corresponding to the travel direction of the vehicle from a traffic light system, and
maintain an ON state of the EOP when the acquired traffic light lighting waiting time is equal to or less than a reference time.

4. The device of claim 1, wherein the controller is configured to:
acquire travel route information of the vehicle from a navigation device of the vehicle, and
detect a traffic light located in front of the vehicle based on the acquired travel route information.

5. The device of claim 1, wherein the controller is configured to maintain an ON state of the EOP when the travel direction of the vehicle is a right turn.

6. The device of claim 1, further comprising a sensor configured to measure a distance between the vehicle and a preceding vehicle traveling in front of the vehicle.

7. The device of claim 6, wherein the controller is configured to maintain an ON state of the EOP when the distance between the vehicle and the preceding vehicle exceeds a reference distance.

8. The device of claim 2, wherein the controller is configured to control the ISG system, the traffic light system, and a navigation device for performing respective functions.

9. A device for controlling an Electric Oil Pump (EOP), which is configured to supply a hydraulic pressure to a vehicle, the device comprising:
a sensor configured to measure a distance between the vehicle and a preceding vehicle traveling in front of the vehicle; and
a controller configured to control driving of the EOP based on the distance between the vehicle and the preceding vehicle in a state in which an engine of the vehicle is stopped as an Idle Stop and Go (ISG) system of the vehicle is operated,
wherein the controller is configured to:
maintain an ON state of the EOP when the distance between the vehicle and the preceding vehicle exceeds a reference distance, and
turn off the EOP when the distance between the vehicle and the preceding vehicle does not exceed the reference distance.

10. The device of claim 9, wherein the controller is further configured to:
acquire a waiting time for lighting a traffic light corresponding to a travel direction of the vehicle from a traffic light system when the EOP is turned off,
determine a traffic light lighting time point from the acquired traffic light lighting waiting time; and
turn on the EOP at a time point ahead, by a reference time, of the determined traffic light lighting time point.

11. A method for controlling an Electric Oil Pump (EOP) of a vehicle, the method comprising:
stopping, by an Idle Stop and Go (ISG) system controlled by a controller of the vehicle, an engine;
in response to stopping the engine, acquiring, by the controller, lighting information of a traffic light corresponding to a travel direction of the vehicle; and
in response to acquiring the lighting information, controlling, by the controller, driving of the electric oil pump (EOP) based on the acquired lighting information.

12. The method of claim 11, wherein the controlling of the driving of the EOP includes:
turning off the EOP;
in response to turning off the EOP, acquiring a waiting time for lighting the traffic light corresponding to the travel direction of the vehicle from a traffic light system;
determining a traffic light lighting time point from the acquired traffic light lighting waiting time; and
turning on the EOP at a time point ahead, by a reference time, of the determined traffic light lighting time point.

13. The method of claim 11, wherein the controlling of the driving of the EOP includes:
acquiring a waiting time for lighting the traffic light corresponding to the travel direction of the vehicle from a traffic light system; and
maintaining an ON state of the EOP when the acquired traffic light lighting waiting time is equal to or less than a reference time.

14. The method of claim 11, wherein the acquiring of the lighting information of the traffic light includes:
acquiring travel route information of the vehicle from a navigation device of the vehicle; and
detecting a traffic light located in front of the vehicle based on the acquired travel route information.

15. The method of claim 11, wherein the controlling of the driving of the EOP includes maintaining an ON state of the EOP when the travel direction of the vehicle is a right turn.

16. The method of claim 11, further comprising measuring, by a sensor, a distance between the vehicle and a preceding vehicle traveling in front of the vehicle.

17. The method of claim 16, wherein the controlling of the driving of the EOP includes maintaining an ON state of the EOP when the distance between the vehicle and the preceding vehicle exceeds a reference distance.

18. The method of claim 11, wherein the controller includes:
- a processor; and
- a non-transitory storage medium on which a program for performing the method of claim 11 is recorded and executed by the processor.

* * * * *